United States Patent
Sato et al.

(10) Patent No.: US 10,457,511 B2
(45) Date of Patent: Oct. 29, 2019

(54) ROTATING MEMBER, SHEET TRANSPORT DEVICE, FIXING DEVICE, AND IMAGE FORMING APPARATUS

(71) Applicant: FUJI XEROX CO., LTD., Tokyo (JP)

(72) Inventors: Hideki Sato, Kanagawa (JP); Jun Sawamura, Kanagawa (JP); Yoshiro Konishi, Kanagawa (JP); Yasuhiro Kato, Kanagawa (JP); Takayuki Ukawa, Kanagawa (JP); Masahiro Akatsuka, Kanagawa (JP); Yusuke Sakurai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 171 days.

(21) Appl. No.: 15/817,294

(22) Filed: Nov. 20, 2017

(65) Prior Publication Data
US 2018/0305150 A1    Oct. 25, 2018

(30) Foreign Application Priority Data
Apr. 21, 2017    (JP) .................. 2017-084746

(51) Int. Cl.
*B65H 5/06*    (2006.01)
*F16C 3/02*    (2006.01)
(Continued)

(52) U.S. Cl.
CPC .............. *B65H 5/06* (2013.01); *F16C 3/02* (2013.01); *F16C 13/00* (2013.01);
(Continued)

(58) Field of Classification Search
CPC ................ F16C 13/00–06; F16C 3/02; G06K 19/06009–06178; G06K 7/00–1495; G03G 21/1647; G03G 15/2053; G03G 15/6529; B65H 5/06; B65H 2404/19; B65H 2601/324
See application file for complete search history.

(56) References Cited

U.S. PATENT DOCUMENTS 3,632,992 A * 1/1972 Wolf .................. G06K 7/10
                                                      235/461
3,818,188 A * 6/1974 Hertel .................. B01L 3/5453
                                                      235/483
(Continued)

FOREIGN PATENT DOCUMENTS

JP    2008-197469    8/2008

*Primary Examiner* — Jacob J Cigna
(74) *Attorney, Agent, or Firm* — JCIPRNET

(57) ABSTRACT

A rotating member includes a rotating-member body, identification information, and a holding member. The rotating-member body having a cylindrical or columnar shape has one end portion and an outer circumferential surface and is to be rotated. The identification information is provided at the one end portion on the outer circumferential surface of the rotating-member body. The holding member is provided at the one end portion of the rotating-member body, holds the rotating-member body, and has an inner circumferential surface in part of which a space not to be in contact with the outer circumferential surface of the rotating-member body is provided. The identification information is disposed in the space of the holding member.

16 Claims, 12 Drawing Sheets

(51) Int. Cl.
*G03G 15/00* (2006.01)
*G03G 15/20* (2006.01)
*G03G 21/16* (2006.01)
*G06K 19/06* (2006.01)
*F16C 13/00* (2006.01)

(52) U.S. Cl.
CPC ..... *G03G 15/2053* (2013.01); *G03G 21/1647* (2013.01); *G06K 19/06028* (2013.01); *G06K 19/06037* (2013.01); *B65H 2402/61* (2013.01); *B65H 2404/19* (2013.01); *B65H 2601/324* (2013.01); *G03G 15/6529* (2013.01)

(56) References Cited

U.S. PATENT DOCUMENTS

| | | | | |
|---|---|---|---|---|
| 4,752,804 | A * | 6/1988 | Ohno | G03G 15/0194 399/300 |
| 4,990,792 | A * | 2/1991 | Frei | B41M 5/24 235/488 |
| 5,777,303 | A * | 7/1998 | Berney | B01L 3/5453 235/375 |
| 6,049,690 | A * | 4/2000 | Nakayasu | G03G 15/5008 399/299 |
| 6,270,728 | B1 * | 8/2001 | Wijnschenk | B01L 3/5453 422/549 |
| 6,818,859 | B2 * | 11/2004 | Lodge | B01L 3/5453 219/121.85 |
| 7,636,540 | B2 * | 12/2009 | Sakai | G03G 15/0194 399/301 |
| 7,674,433 | B2 * | 3/2010 | Smith | B01L 3/50855 422/506 |
| 8,287,821 | B2 * | 10/2012 | Nakahana | B01L 3/5082 215/6 |
| 8,626,041 | B2 * | 1/2014 | Tominaga | G03G 15/043 399/167 |
| 2008/0193165 | A1 | 8/2008 | Nakazawa et al. | |
| 2010/0188693 | A1 * | 7/2010 | Dan | B41J 2/17546 358/1.15 |
| 2013/0246136 | A1 * | 9/2013 | Ramsey | G06Q 20/3276 705/14.12 |
| 2016/0292697 | A1 * | 10/2016 | Ramsey | G06Q 20/3276 |
| 2017/0213118 | A1 * | 7/2017 | Welin | G06K 19/06028 |

* cited by examiner

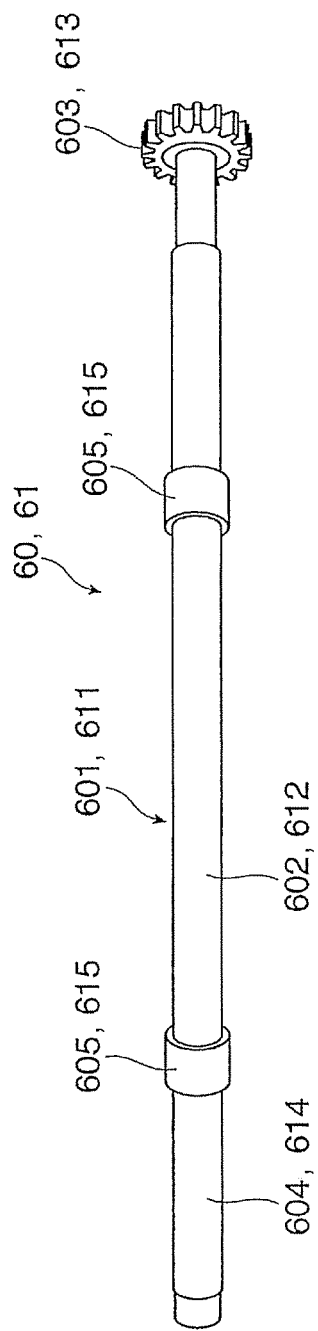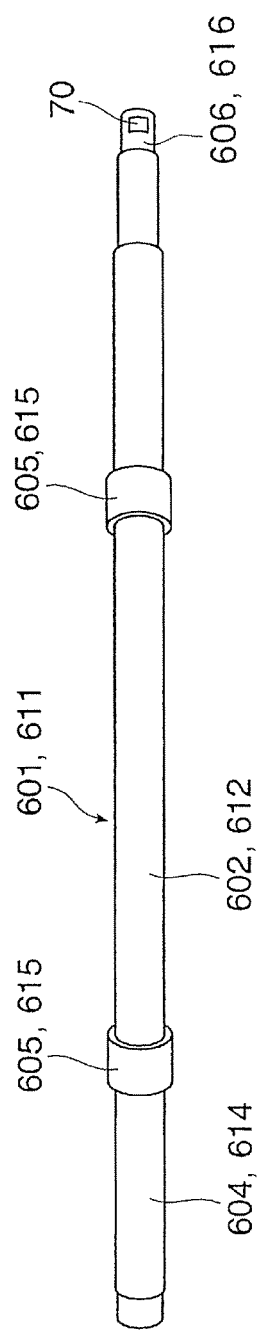

ROTATING MEMBER, SHEET TRANSPORT DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2017-084746 filed Apr. 21, 2017.

BACKGROUND

(i) Technical Field

The present invention relates to a rotating member, a sheet transport device, a fixing device, and an image forming apparatus.

(ii) Related Art

In some cases, heating rollers or other rotating members used for related-art image forming apparatuses are provided with identification information for identifying manufacturing time and the like of the heating rollers.

SUMMARY

According to an aspect of the present invention, a rotating member includes a rotating-member body, identification information, and a holding member. The rotating-member body having a cylindrical or columnar shape has one end portion and an outer circumferential surface and is to be rotated. The identification information is provided at the one end portion on the outer circumferential surface of the rotating-member body. The holding member is provided at the one end portion of the rotating-member body, holds the rotating-member body, and has an inner circumferential surface in part of which a space not to be in contact with the outer circumferential surface of the rotating-member body is provided. The identification information is disposed in the space of the holding member.

BRIEF DESCRIPTION OF THE DRAWINGS

Exemplary embodiments of the present invention will be described in detail based on the following figures, wherein:

FIGS. 15A and 15B are structural views of a sheet transport device for which rotating members according to a third exemplary embodiment of the present invention are used;

DETAILED DESCRIPTION

Exemplary embodiments of the present invention will be described below with reference to the drawings.

First Exemplary Embodiment

Figure 1:
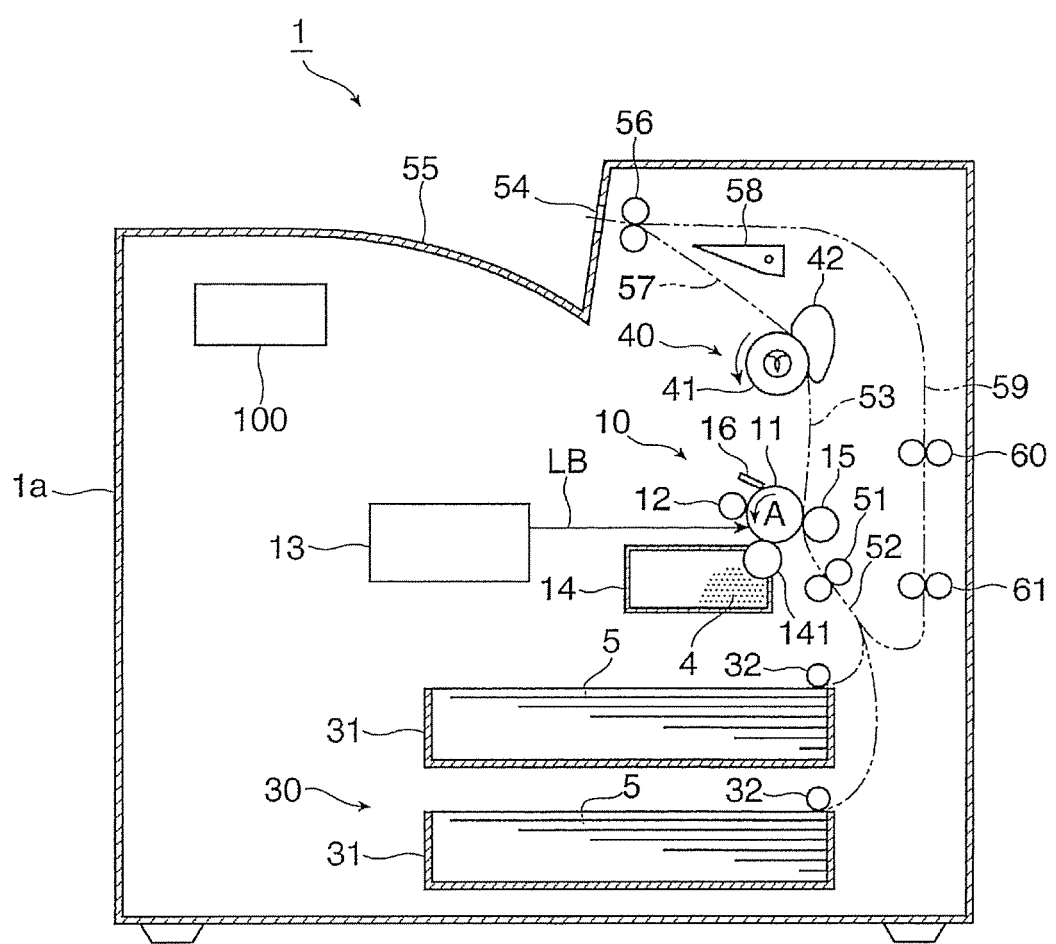
FIG. 1 is a schematic structural view of an image forming apparatus for which a rotating member and a fixing device according to a first exemplary embodiment of the present invention are used.
Figure 2:
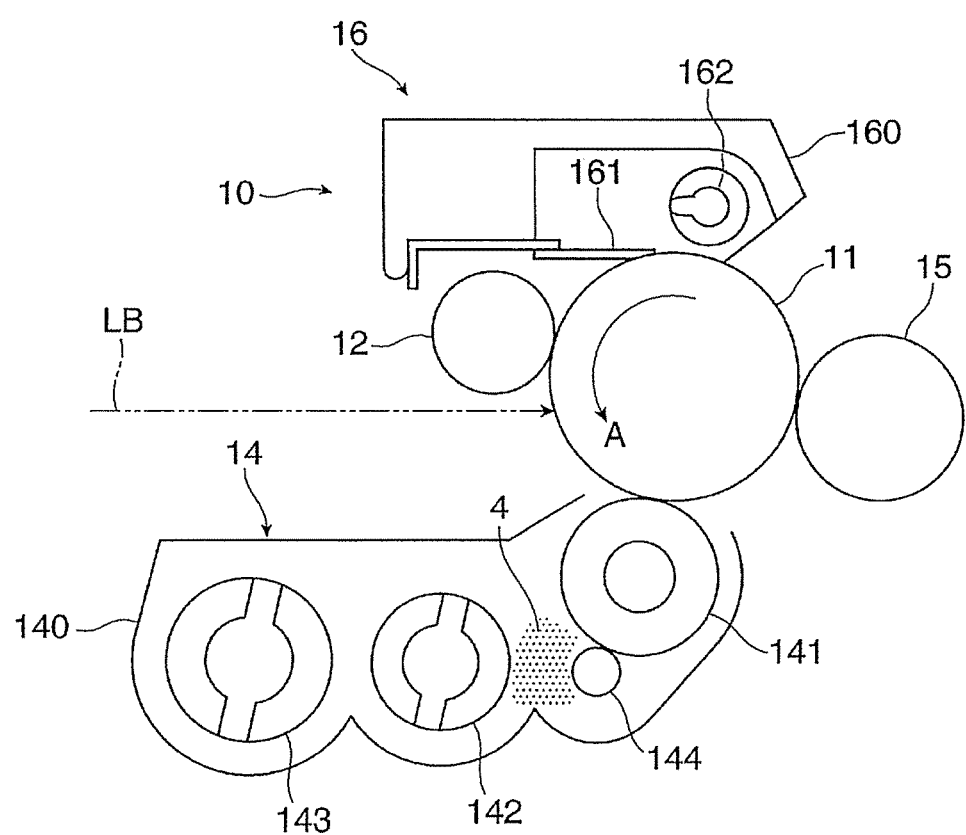
FIG. 2 is a structural view of an image forming unit of the image forming apparatus according to the first exemplary embodiment of the present invention.

FIGS. 1 and 2 illustrate an image forming apparatus for which a rotating member and a fixing device according to a first exemplary embodiment are used. FIG. 1 is a schematic overall view of this image forming apparatus, and FIG. 2 is an enlarged view of parts (an image forming device and so forth) of the image forming apparatus.

An Overall Structure of the Image Forming Apparatus

An image forming apparatus 1 according to the first exemplary embodiment is, for example, a monochrome printer. The image forming apparatus 1 includes, for example, an image forming device 10, a transfer device 15, a sheet feed device 30, and a fixing device 40. The image forming device 10 serving as an example of an image forming unit forms toner images developed with toner included in developer 4. The transfer device 15 transfers the toner images formed by the image forming device 10 onto recording sheets 5. Each of the recording sheets 5 serves as an example of a recording medium. The sheet feed device 30 contains the required recording sheets 5 to be supplied to a transfer position of the transfer device 15 and transports the recording sheets 5. The fixing device 40 fixes the toner images on the recording sheets 5 having been transferred onto the recording sheets 5 by the transfer device 15. Reference sign 1a illustrated in, for example, FIG. 1 denotes an apparatus body of the image forming apparatus 1. The apparatus body 1a includes, for example, support structure members that include plates and so forth and exterior coverings. Also in FIG. 1, two-dot chain lines indicate transport paths through which each of the recording sheets 5 is typically transported in the image forming apparatus 1.

The image forming device 10 includes a single image forming device 10 that forms black (K) toner images. The image forming device 10 is disposed at a position in an inner space of the apparatus body 1a that is substantially central in the vertical direction and close to one side surface (right side surface in the example illustrated in, for example, FIG. 1).

As illustrated in FIGS. 1 and 2, the image forming devices 10 includes a rotating photosensitive drums 11 servings as an example of an image holding member. Devices included in a unit that serves as an example of a toner image forming section are typically disposed around the photosensitive drum 11 as follows. These devices include, for example, a charger 12, a light exposure device 13, a developing device 14, a transfer device 15, and a drum cleaner 16. The charger 12 charges to a required potential a circumferential surface (image holding surface) of the photosensitive drum 11 on which an image formation is possible. The light exposure device 13 serving as an example of an electrostatic latent image forming unit radiates light LB in accordance with information (signal) of an image to the charged circumferential surface of the photosensitive drum 11 so as to form an electrostatic latent image having a potential difference. The developing device 14 serving as an example of a developing section develops the electrostatic latent image with the toner of the black (K) developer 4 so as to form a toner image. The transfer device 15 serving as an example of a first transfer unit transfers the toner image onto a recording sheet 5. The drum cleaner 16 cleans the photosensitive drum 11 by removing adhering matter such as toner remaining on and adhering to the image holding surface of the photosensitive drum 11 after the transfer has been performed.

The photosensitive drum 11 includes a grounded cylindrical or columnar base member. The image holding surface having a photoconductive layer (photosensitive layer) made of a photosensitive material is formed on the circumferential surface of the base member. This photosensitive drum 11 is supported such that the photosensitive drum 11 is rotated in an arrow A direction by a motive force transmitted from a drive device (not illustrated).

The charger 12 includes a contact-type charging roller disposed so as to be in contact with the photosensitive drum 11. A charging voltage is supplied to the charger 12. In the case where the developing device 14 performs reversal development, a voltage or a current the polarity of which is the same as that of the toner supplied from the developing device 14 is supplied as the charging voltage. The charger 12 may be a contactless-type charging device such as a scorotron disposed so as not to be in contact with the photosensitive drum 11.

The light exposure device 13 radiates the light LB formed in accordance with information (signal) of an image input to the image forming apparatus 1 to the charged circumferential surface of the photosensitive drum 11 so as to form an electrostatic latent image. The information (signal) of the image transmitted to the light exposure device 13 has been input to the image forming apparatus 1 by an arbitrary device and subjected to image processing performed by an image processing unit. As the light exposure device 13, for example, a light-emitting-diode (LED) print head may be used. The LED print head includes plural LEDs as light emitting elements arranged in the axial direction of the photosensitive drum 11 so as to radiate the light in accordance with the image information to the photosensitive drum 11, thereby forming the electrostatic latent image.

As illustrated in FIG. 2, the developing device 14 includes, for example, a developing roller 141, two agitating and transport members 142 and 143, and a layer-thickness regulating member 144. These components are disposed in a housing 140 that has an opening and container chamber for the developer 4. The developing roller 141 holds the developer 4 and transports the developer 4 to a developing region facing the photosensitive drum 11. The agitating and transport members 142 and 143 include screw augers or the like and transport the developer 4 so that the developer 4 passes through the developing roller 141 while agitating the developer 4. The layer-thickness regulating member 144 regulates the amount (layer thickness) of the developer 4 held by the developing roller 141. A developing bias voltage is supplied between the developing roller 141 and the photosensitive drum 11 of the developing device 14 from a power unit (not illustrated). Furthermore, each of the developing roller 141 and the agitating and transport members 142 and 143 is rotated in a required direction by a motive force transmitted from drive device (not illustrated). Furthermore, two-component developer that includes non-magnetic toner and magnetic carrier is used as the developer 4.

The transfer device 15 is a contact-type transfer device that includes a transfer roller. The transfer roller is in contact with a circumference of the photosensitive drum 11 so as to be rotated. A transfer voltage is supplied to the transfer roller. As the transfer voltage, a direct-current voltage the polarity of which is opposite to the polarity to which the toner is charged is supplied from a power unit (not illustrated).

As illustrated in FIG. 2, the drum cleaner 16 includes, for example, a body 160, a cleaning plate 161, and a feed member 162. The body 160 has a container shape and is partially open. The cleaning plate 161 is disposed so as to be in contact at a required pressure with the circumferential surface of the photosensitive drum 11 having undergone the first transfer, thereby cleaning the circumferential surface of the photosensitive drum 11 by removing adhering matter such as residual toner. The feed member 162 that includes a screw auger or the like collects the adhering matter such as toner removed by the cleaning plate 161 and transports the adhering matter so as to feed the adhering matter to a collection system (not illustrated). A plate-shaped member (for example, blade) formed of, for example, rubber is used as the cleaning plate 161.

The fixing device 40 includes, for example, a heating rotating member 41 and a pressure rotating member 42 which are disposed in a housing (not illustrated) having an entrance and an exit for the recording sheet 5. The heating rotating member 41 is in the form of a roller or a belt, rotated in a direction indicated by an arrow, and heated by a heating unit so that the surface temperature of the heating rotating member 41 is maintained at a specified temperature. The pressure rotating member 42 is in the form of a belt or a roller and in contact with the heating rotating member 41 substantially in the axial direction of the heating rotating member 41 with a specified pressure, thereby the pressure rotating member 42 is rotated. This fixing device 40 has a contact portion where the heating rotating member 41 and the pressure rotating member 42 are in contact with each other. This contact portion serves as a fixing process portion where a required fixing process (heating and applying pressure) is performed. The fixing device 40 will be described in detail later.

The sheet feed device 30 is disposed below the image forming device 10 in the vertical direction. This sheet feed device 30 includes, for example, plural (or a single) sheet containers 31 and feed devices 32. The sheet containers 31 each contain the stacked recording sheets 5 of a size, type, and so forth a user wishes to use. The feed devices 32 each feed one sheet after another from the recording sheets 5 contained in a corresponding one of the sheet containers 31. The sheet container 31 is attached so as to, for example, allow the sheet container 31 to be drawn to the front surface side (side surface facing a user who operates the sheet container 31), that is, the left side surface side illustrated in, for example, FIG. 1 of the apparatus body 1a.

Examples of the recording sheets 5 include, for example, thin paper, overhead projector (OHP) transparencies, and plain paper used for electrophotographic copiers, printers, and so forth. In order to further improve smoothness of image surfaces after fixing, smoothness of the front sides of the recording sheets 5 may be increased as much as possible. For example, coated paper made by coating the front side of plain paper with resin or the like, so-called cardboard such as art paper for printing having a comparatively large basis weight, and the like may also be used.

A sheet feed transport path 52 is provided between the sheet feed device 30 and the transfer device 15. The sheet feed transport path 52 is formed by a single (or plural) sheet transport roller pair 51, a transport guide (not illustrated), and so forth. The recording sheet 5 fed from the sheet feed device 30 is transported to the transfer position through the sheet feed transport path 52. The sheet transport roller pair 51 serves as, for example, rollers that adjust timing at which the recording sheet 5 is transported (registration rollers). Furthermore, a sheet transport path 53 and a transport guide (not illustrated) are provided between the transfer device 15 and the fixing device 40. The recording sheet 5 having undergone the transfer and fed from the transfer device 15 is transported to the fixing device 40 through the sheet transport path 53 and a transport guide.

Furthermore, an output transport path 57 is provided near a sheet exit 54 formed in an upper end portion of the apparatus body 1a. The output transport path 57 is provided with a sheet output roller pair 56 for outputting the recording sheet 5 having undergone fixing and fed from the fixing device 40 to a sheet output section 55 provided in an upper portion of the apparatus body 1a. Furthermore, a switching gate 58 that switches the output direction of the recording sheet 5 is provided at an exit portion of the fixing device 40. The rotational direction of the sheet output roller pair 56 is switchable between a forward direction (output direction) and a reverse direction. In order to form images on both sides of the recording sheet 5, the rotational direction of the sheet output roller pair 56 is switched from the forward direction (output direction) to the reverse direction after a trailing end of the recording sheet 5 on one side of which an image had been formed has been passed through the switching gate 58. The transport path of the recording sheet 5 transported in the reverse direction by the sheet output roller pair 56 is switched by the switching gate 58, so that this recording sheet 5 is transported to a duplex transport path 59 extending in the substantially vertical direction. The duplex transport path 59 is provided with sheet transport roller pairs 60 and 61, a transport guide (not illustrated), and so forth. The sheet transport roller pairs 60 and 61 transports the inverted recording sheet 5 to the sheet transport roller pair 51.

Reference numeral 100 illustrated in FIG. 1 denotes a controller that controls entire operation of the image forming apparatus 1. The controller 100 includes components and so forth (not illustrated) such as a central processing unit (CPU), a read only memory (ROM), a random access memory (RAM), buses through which these CPU, ROM, and so forth are connected, and a communication interface.

Operation of the Image Forming Apparatus

Basic image forming operation performed by the image forming apparatus 1 is described below.

Upon receiving instruction information, by using the controller 100, requesting an image forming operation (printing), the image forming device 10, the transfer device 15, the sheet feed device 30, the fixing device 40, and so forth are started in the image forming apparatus 1.

Consequently, in the image forming device 10, first, the photosensitive drum 11 is rotated in the arrow A direction, and the charger 12 charges the surface of the photosensitive drum 11 to the required polarity (negative polarity according to the first exemplary embodiment) and the required potential. Next, the light exposure device 13 radiates light emitted in accordance with an image signal input to the image forming apparatus 1 to the surface of the charged photosensitive drum 11. Thus, an electrostatic latent image having the required potential is formed on the surface of the photosensitive drum 11.

Next, the image forming device 10 supplies the black (K) toner charged to the required polarity (negative polarity) from the developing roller 141 to the electrostatic latent image formed on the photosensitive drum 11. Thus, the electrostatic latent image is developed by causing the toner to electrostatically adhere to the photosensitive drum 11. Through this development, the electrostatic latent image formed on the photosensitive drum 11 is made visible as a toner image developed with the black (K) toner.

Next, the toner image formed on the photosensitive drum 11 of the image forming device 10 is transported to the transfer position. Meanwhile, the sheet feed device 30 feeds the required recording sheet 5 to the sheet feed transport path 52 such that the feeding of the recording sheet 5 is adjusted to the image forming operation. The recording sheet 5 is fed and supplied to the transfer position by the sheet transport roller pair 51 serving as the registration rollers at timing adjusted to timing of the transfer in the sheet feed transport path 52.

The transfer device 15 transfers the toner image on the photosensitive drum 11 onto the recording sheet 5 at the transfer position. Furthermore, the drum cleaner 16 cleans the surface of the photosensitive drum 11 by removing the adhering matter such that the adhering matter is scraped off from the surface of the photosensitive drum 11 in the image forming device 10 where the transfer has been performed. Thus, the image forming device 10 is ready to perform the next image forming operation.

Next, the recording sheet 5 onto which the toner image has been transferred is transported to the fixing device 40 along the sheet transport path 53. In the fixing device 40, the recording sheet 5 having undergone the transfer is introduced into and passes through the contact portion between the heating rotating member 41 being rotated and the pressure rotating member 42 being rotated. This causes the recording sheet 5 to be subjected to the required fixing process (heating and applying pressure), thereby the unfixed toner image is fixed onto the recording sheet 5. At last, in the case of the image forming operation where image formation is performed on only one of the sides of the recording sheet 5, the recording sheet 5 having undergone the fixing is output to, for example, the sheet output section 55 provided in the upper portion of the apparatus body 1a by the sheet output roller pair 56.

Furthermore, in the case of forming images on both sides of the recording sheet 5, the rotational direction of the sheet output roller pair 56 is switched to the reverse direction while the trailing end of the recording sheet 5 is held by the sheet output roller pair 56 without outputting by the sheet output roller pair 56 the recording sheet 5 on one side of which an image has been formed to the sheet output section 55. The recording sheet 5 transported in the reverse direction by the sheet output roller pair 56 passes through the upper side of the switching gate 58, and then, is transported in the inverted state to the sheet transport roller pair 51 again through the duplex transport path 59 provided with the sheet transport roller pairs 60 and 61, the transport guide (not illustrated), and so forth. The sheet transport roller pair 51 feeds and supplies the recording sheet 5 to the transfer position at timing adjusted to timing of transfer so as to allow an image to be formed on the back side of the recording sheet 5. The recording sheet 5 is output by the sheet output roller pair 56 to the sheet output section 55 provided in the upper portion of the apparatus body 1*a*.

Through the above-described operation, the recording sheet 5 on which a monochrome image or monochrome images have been formed is output.

Structure of the Fixing Device

Figure 3:
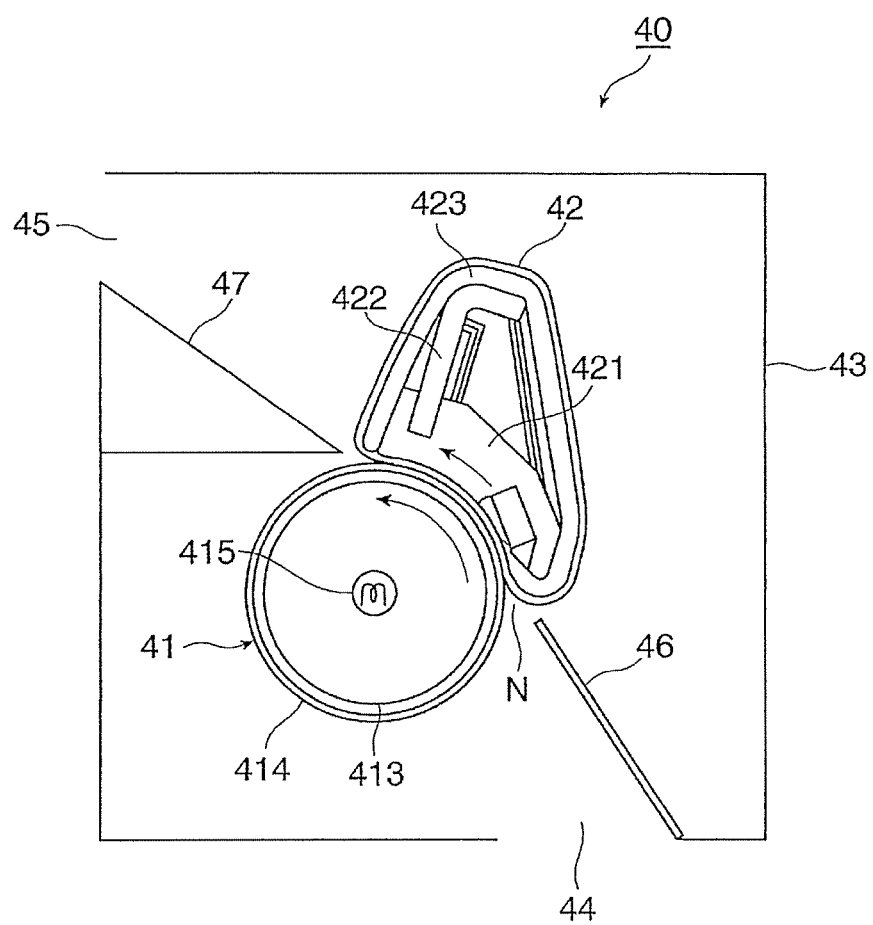
FIG. 3 is a structural view of the fixing device for which the rotating member according to the first exemplary embodiment of the present invention is used.

FIG. 3 is a structural sectional view of the fixing device for which a rotating member according to the first exemplary embodiment is used.

As illustrated in FIG. 3, the fixing device 40 includes a housing 43 being a box body having a substantially rectangular parallelepiped shape. The housing 43 has an entrance 44 and an exit 45 for the recording sheet 5. A flat plate-shaped entrance guide plate 46 is provided at the entrance 44 of the housing 43. The recording sheet 5 having been transported along the sheet transport path 53 is introduced by the entrance guide plate 46 into a fixing nip N where the heating roller 41 serving as an example of the heating rotating member and the pressure belt 42 serving as an example of the pressure rotating member are in pressure contact with each other. Furthermore, an exit guide member 47 is provided at the exit 45 of the housing 43 so as to guide the recording sheet 5 having undergone the fixing process performed in the fixing nip N where the heating roller 41 and the pressure belt 42 are in pressure contact with each other. Another exit guide member (not illustrated) is disposed at a position facing the exit guide member 47 so as to guide the back side of the recording sheet 5 having undergone the fixing process.

Figure 4:
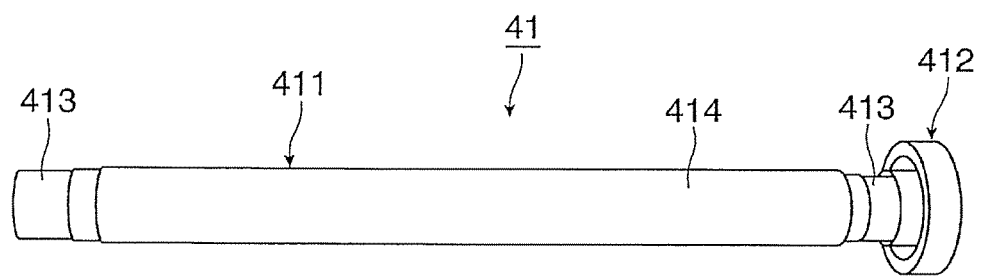
FIG. 4 is a structural perspective view of a heating roller.

The heating roller 41 serving as the rotating member according to the present exemplary embodiment and the pressure belt 42 are in pressure contact with each other to form the fixing nip N and are provided in the housing 43 of the fixing device 40. The state of the heating roller 41 and the pressure belt 42 is switchable between a contact state in which the heating roller 41 and the pressure belt 42 are in pressure contact with each other at a required pressure and a separate state in which the heating roller 41 and the pressure belt 42 are kept separated from each other according to need. As illustrated in FIG. 4, the heating roller 41 includes a cylindrical heating-roller body 411 and a drive gear 412 serving as an example of a holding member that holds one end portion of the heating-roller body 411.

As illustrated in FIG. 3, the heating-roller body 411 includes a cylindrical member 413, a heat-resistant elastic layer 414, and a mold release layer (not illustrated). The cylindrical member 413 having cylindrical shape is formed of metal such as an aluminum alloy or stainless steel. The heat-resistant elastic layer 414 coated over the surface of the cylindrical member 413 to a comparative small thickness is formed of, for example, heat-resistant silicone rubber. The mold release layer coated over the surface of the heat-resistant elastic layer 414 is formed of, for example, tetrafluoroethylene or perfluoroalkoxy alkane (PFA). Furthermore, a halogen lamp 415 serving as a heat source is disposed in the heating roller 41. The heating roller 41 is configured such that the heating roller 41 is heated by the halogen lamp 415 from inside while power supply to the halogen lamp 415 is controlled by a temperature controller (not illustrated) by detecting the surface temperature with a temperature sensor (not illustrated), so that the surface temperature of the heating roller 41 becomes a predetermined fixing process temperature. Furthermore, the heating roller 41 is rotated by transmitting a rotational drive force from outside by a drive source (not illustrated).

The pressure belt 42 is formed to have an endless belt shape. The pressure belt 42 applies pressure to the recording sheet 5 passing though the fixing nip N by pinching the recording sheet 5 between the pressure belt 42 and the heating roller 41. The pressure belt 42 is rotated by being driven by the heating roller 41 being rotated. The pressure belt 42 is structured, for example, as follows: a mold release layer formed of fluorocarbon resin is formed on the surface of a belt base material that has a thin cylindrical shape and formed of synthetic resin such as polyimide.

The pressure belt 42 includes a pressing member 421, a pressing support member 422, and rotation support members 423. The pressing member 421 presses the pressure belt 42 against the heating roller 41. The pressing support member 422 has a substantially L shape in section and supports the pressing member 421. The rotation support members 423 are disposed at both ends in the axial direction of the pressure belt 42 so as to support the pressure belt 42 such that the pressure belt 42 is rotatable. The pressing member 421 is disposed at a position at an inner circumference of the pressure belt 42 facing the heating roller 41 with the pressure belt 42 interposed therebetween. The pressing member 421 presses the pressure belt 42 against the heating roller 41 through the inner circumferential surface of the pressure belt 42, thereby the fixing nip N is formed. The pressing support member 422 is provided behind the pressing member 421 when seen from the fixing nip N. The pressing support member 422 supports the pressing member 421 on the inner circumferential side of the pressure belt 42 and also supports the rotation support members 423 at both the ends in a secured state.

Figure 5:
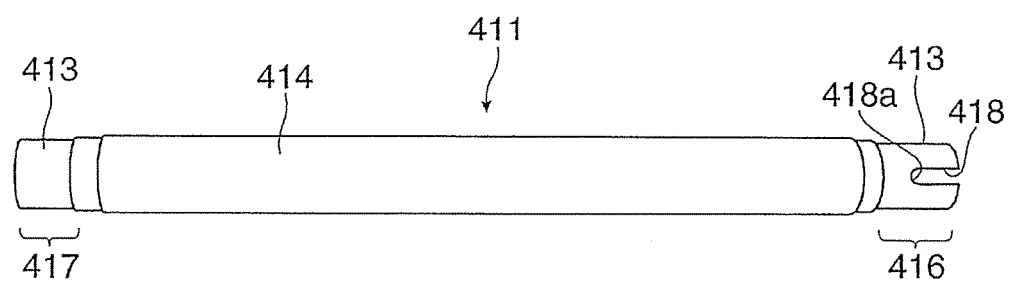
FIG. 5 is a structural perspective view of a heating-roller body.
Figure 6:
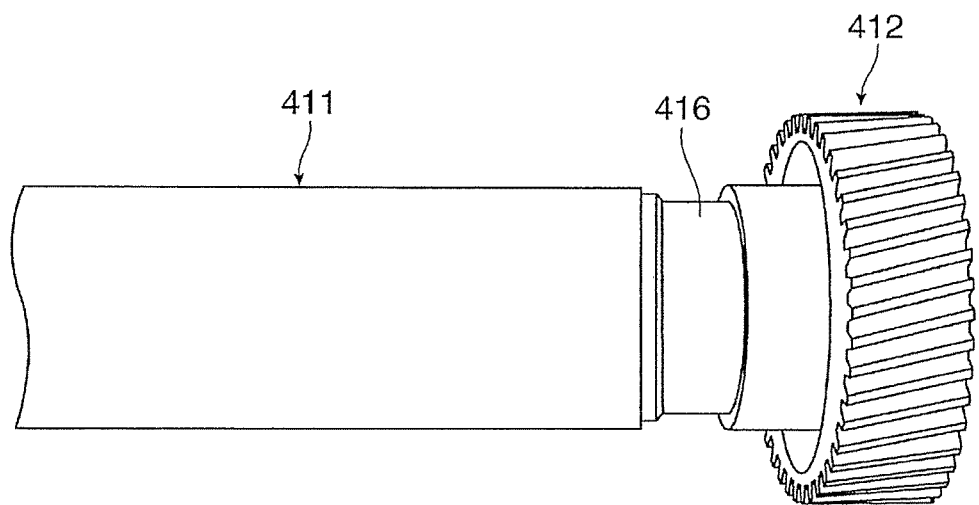
FIG. 6 is a structural perspective view of part of the heating roller.

The heating-roller body 411 serving as an example of a rotating-member body is, as illustrated in FIG. 5, formed to have a cylindrical shape. The heating-roller body 411 is provided with holding portions 416 and 417. Each of the holding portions 416 and 417 is provided at corresponding one of one and the other end portions of the heating-roller body 411. The heating-roller body 411 is rotatably held by the holding portions 416 and 417. Each of the holding portions 416 and 417 is part of the cylindrical member 413 itself exposed at a corresponding one of the one and the other end portions of the heating-roller body 411. As illustrated in FIG. 6, a bearing member (not illustrated) and the drive gear 412 serving as the holding member by which the heating-roller body 411 is rotatably held are attached to the holding portion 416 positioned at the one end portion of the heating-roller body 411. Furthermore, a bearing member (not illustrated) that serves as a holding member by which the heating-roller body 411 is rotatably held are attached to the holding portion 417 positioned at the other end portion of the heating-roller body 411. As the bearing members, rolling bearings such as roller bearings, ball bearings, or the like or sliding bearings are used. Furthermore, cylindrical sleeves (not illustrated) formed of synthetic resin or the like are disposed between the bearing members and the holding portions 416 and 417 of the heating-roller body 411.

As illustrated in FIG. 5, cuts 418 for attachment of the drive gear 412 are provided at the one end portion of the heating-roller body 411. The cuts 418 are provided at positions that face each other and are spaced from each other by 180 degrees in the circumferential direction of the heating-roller body 411. Each of the two cuts 418 is formed at the one end portion of the heating-roller body 411 and have a required opening width and a required length in the axial direction of the heating-roller body 411. Furthermore, an end portion 418a of the cut 418 on the inner side in the axial direction of the cut 418 is curved into a semi-circular shape.

Figure 7:
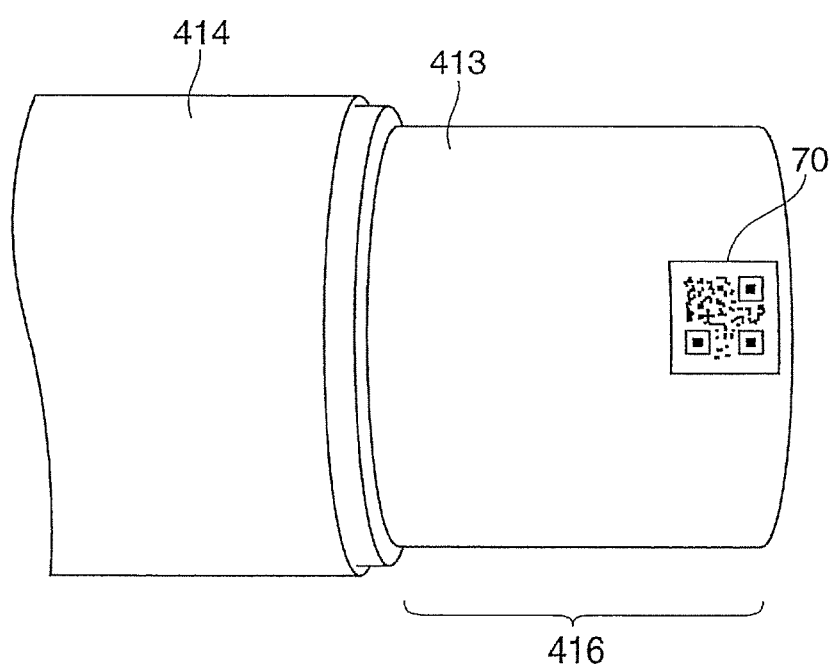
FIG. 7 is a structural perspective view illustrating identification information of the heating roller.

Furthermore, as illustrated in FIG. 7, identification information 70 is provided near an end portion in the axial direction in the holding portion 416 which is the one end portion of the heating-roller body 411 and to which the drive gear 412 is attached. The identification information 70 includes a quick response code (QR code; registered trademark), a bar code, or the like (a QR code is illustrated as an example in FIG. 7). A QR code is a matrix-type two-dimensional code. The QR code contains information in two directions, that is, the length and width directions whereas a bar code contains information only in a one dimension. Accordingly, the amount of information stored in the QR code is larger than that in the bar code, and the QR code is able to store not only numerals but also characters, symbols, and so forth. The identification information 70 is formed by, for example, laser printing in which graphics, characters, and so forth are inscribed by using laser beams, printing with ink, or the like. Examples of pieces of the identification information 70 include, for example, a part number, a manufacturing date, and a manufacturing location of the heating-roller body 411. However, pieces of the identification information 70 are not limited to these and, of course, may include other arbitrary pieces of information such as a lot number of the heat-resistant elastic layer 414 of the heating-roller body 411 and the like.

The identification information 70 is formed, for example, at a midpoint of the two cuts 418 with reference to the positions of the two cuts 418 provided in the heating-roller body 411, that is, at a position where central angles of about 90 degrees are formed relative to the two cuts 418. Of course, the identification information 70 may be provided at a position other than the midpoint of the two cuts 418.

Figure 8:
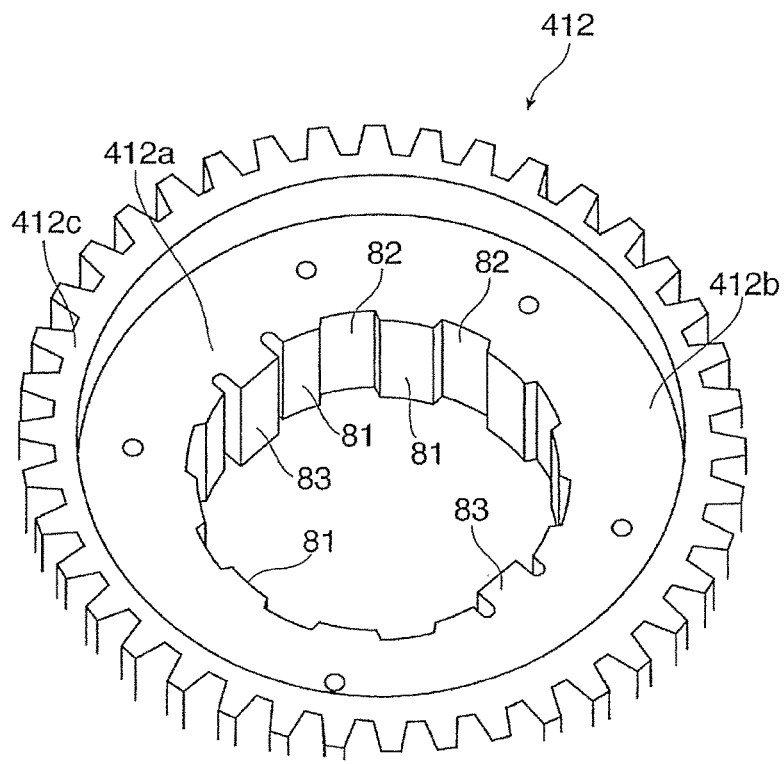
FIG. 8 is a structural perspective view of a drive gear.
Figure 9:
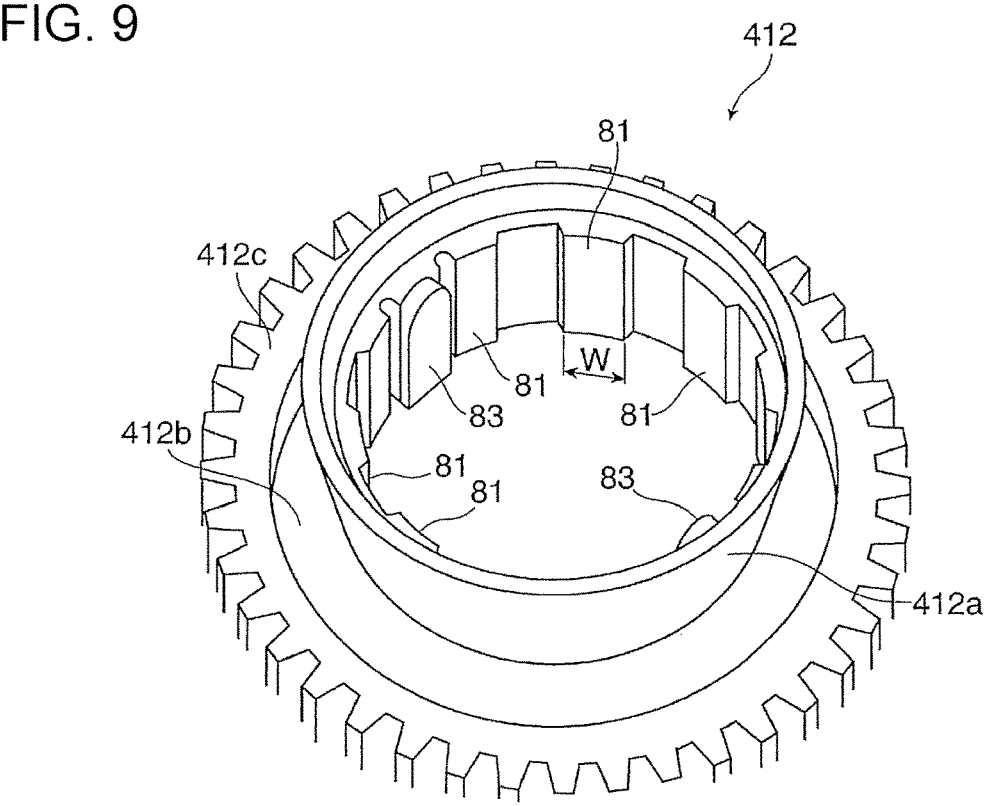
FIG. 9 is a structural perspective view of the drive gear.

As illustrated in FIGS. 8 and 9, the drive gear 412 includes a helical gear integrally formed by, for example, injection molding polyphenylene sulfide (PPS), polyether ether ketone (PEEK), polyethersulfone (PES), polyamide-imide (PAI), liquid crystal polymer (LCP), polytetrafluoroethylene (PTFE), polychlorotrifluoroethylene (PCTFE), or polyvinylidene difluoride (PVDF), a composite material of any of these, or the like. The drive gear 412 includes a cylinder portion 412a, an annular portion 412b, and a gear portion 412c. The cylinder portion 412a has a cylindrical shape and is attached to the heating-roller body 411. The annular portion 412b is formed radially outside the cylinder portion 412a so as to have an annular shape having a large thickness. The gear portion 412c is formed at an outer circumference of the annular portion 412b and is included in the helical gear. As illustrated in FIG. 9, the cylinder portion 412a of the drive gear 412 projects inward more than the gear portion 412c in the axial direction. Furthermore, as illustrated in FIG. 8, an outer end portion of the cylinder portion 412a of the drive gear 412 in the axial direction is formed at the same position as the position of the annular portion 412b. Furthermore, the gear portion 412c of the drive gear 412 projects outward more than the annular portion 412b in the axial direction. The end portion of the heating-roller body 411 is flush with end portions of the cylinder portion 412a and the annular portion 412b.

Figure 10:
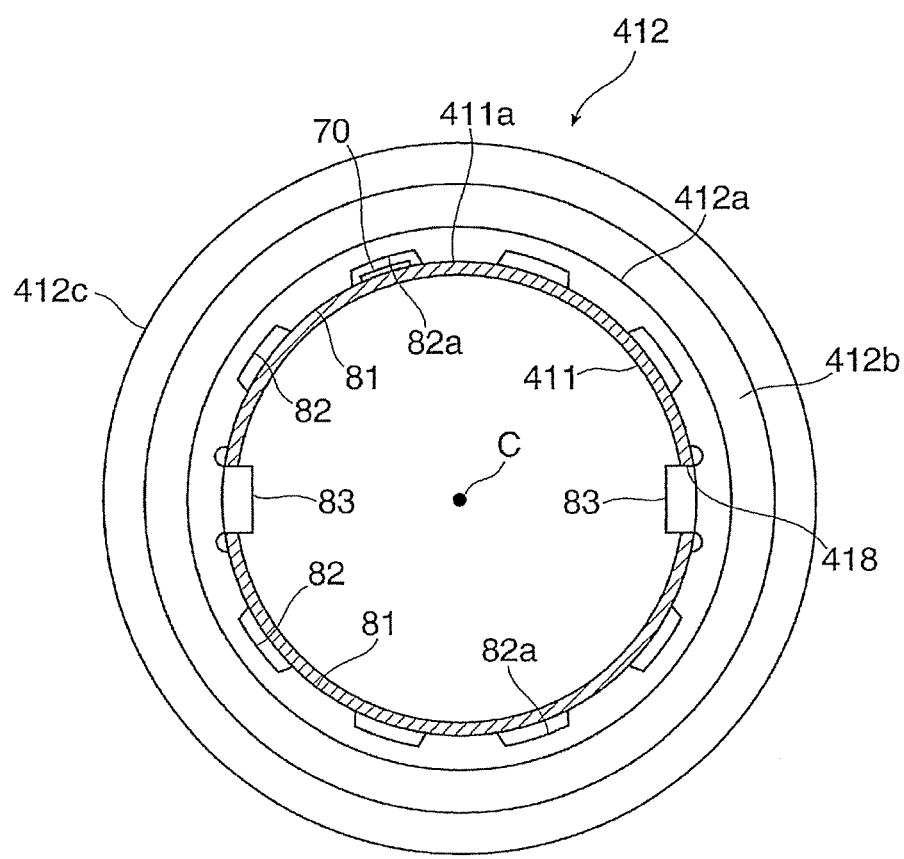
FIG. 10 is a structural side view illustrating an attachment state of the drive gear.

Plural first projections 81 to be in contact with an outer circumferential surface of the heating-roller body 411 are arranged in the circumferential direction on an inner circumferential surface of the cylinder portion 412a of the drive gear 412. According to the present exemplary embodiment, as illustrated in FIGS. 8 to 10, ten first projections 81 are arranged in the circumferential direction on the inner circumferential surface of the cylinder portion 412a. The radius of curvature of an inner circumferential surface of each of the first projections 81 is substantially the same as that of the outer circumferential surface of the heating-roller body 411. Each of the first projections 81 faces a corresponding one of the other first projections 81 with a central axis C of the heating-roller body 411 interposed therebetween so as to be axially symmetric with each other about the central axis C. In the axial direction, the length of the first projections 81 is equal to the length of the cylinder portion 412a. A width W of the first projections 81 are appropriately set. As has been described, an inner end of each of the first projections 81 has an arc shape that follows the shape of the outer circumferential surface of the heating-roller body 411.

Spaces 82 not to be in contact with an outer circumferential surface 411a of the heating-roller body 411 are arranged in the circumferential direction in parts of the inner circumferential surface of the drive gear 412. Each of the spaces 82 is disposed between a corresponding one of the first projections 81 and the adjacent first projection 81 of the drive gear 412. It is sufficient that outer circumferential surfaces 82a of the spaces 82 facing the outer circumferential surface 411a of the heating-roller body 411 are not in contact with the outer circumferential surface 411a of the heating-roller body 411. The height of the spaces 82 is appropriately set. Referring to FIGS. 7 and 10, one of the plural spaces 82 is disposed at a position facing the identification information 70 of the heating-roller body 411. That is, the identification information 70 of the heating-roller body 411 is disposed in this space 82 of the drive gear 412.

According to the present exemplary embodiment, as illustrated in FIG. 10, ten first projections 81 are arranged in the circumferential direction on the inner circumferential surface of the drive gear 412, and the spaces 82 are each disposed between a corresponding one of the first projections 81 and the adjacent first projection 81. The identification information 70 of the heating-roller body 411 is formed at a position corresponding to one of the spaces 82 formed between one of the first projections 81 at an uppermost position and the other first projection 81 adjacent to the first projection 81 at the uppermost position. The identification information 70 of the heating-roller body 411 is disposed in this space 82 of the drive gear 412. The identification information 70 may be provided at plural positions in the circumferential direction of the heating-roller body 411 corresponding to the insides of the spaces 82 of the drive gear 412.

Furthermore, as illustrated in FIGS. 8 to 10, plural (two in the example illustrated in, for example, FIG. 10) second projections 83 are arranged in the circumferential direction on the inner circumferential surface of the cylinder portion 412a of the drive gear 412. The second projections 83 are formed so as to be fitted into the cuts 418 of the heating-roller body 411. When the drive gear 412 is attached to the heating-roller body 411, the second projections 83 are inserted into the cuts 418 of the heating-roller body 411. The amount of inward projection of the second projections 83 is set to be larger than that of the first projections 81. The second projections 83 have such a length that, when the second projections 83 are fitted into the cuts 418 of the heating-roller body 411, the second projections 83 project to the same position as the position of the inner circumferential surface of the heating-roller body 411 or further to the inside than the inner circumferential surface of the heating-roller body 411.

Operation of Characteristic Part of the Image Forming Apparatus

In the fixing device 40 according to the present exemplary embodiment, as illustrated in FIG. 3, the recording sheet 5 having undergone the transfer and holding the unfixed toner image is introduced into and passes through the fixing nip N between the heating roller 41 being rotated and the pressure belt 42 being rotated. This causes the recording sheet 5 to be subjected to the required fixing process (heating and applying pressure), thereby the unfixed toner image is fixed onto the recording sheet 5.

Regarding the fixing device 40, when the fixing device 40 is used over time, problems such as fixing failure of toner images on the recording sheets 5 and creasing of the recording sheets 5 may occur. It is thought that there are various factors as the causes of these problems such as fixing failure of toner images on the recording sheets 5 and creasing of the recording sheets 5. Examples of these factors include, for example, failure in the manufacture of the heating roller 41 and degradation of thermal properties of the heating roller 41 due to use of the heating roller 41 over time.

In the case where the problems such as fixing failure of toner images on the recording sheets 5 and creasing of the recording sheets 5 are caused by the heating roller 41, for example, the entirety of the fixing device 40, which is configured as a separate unit of the apparatus body 1a of the image forming apparatus 1, is replaced with a new fixing device 40 by a user or a service engineer. In so doing, the removed fixing device 40 is collected by, for example, the service engineer.

Then, the fixing device 40 having been collected is disassembled and checked for the factor which causes the fixing failure or the like. Referring to FIGS. 4 and 5, the heating roller 41 is removed from the housing 43 of the fixing device 40, and the drive gear 412 is removed from the heating roller 41 so as to separate the heating-roller body 411.

As illustrated in FIG. 7, the identification information 70 is provided on the heating-roller body 411. The identification information 70 include pieces of information such as a part number, a manufacturing date, and a manufacturing location of the heating-roller body 411. Accordingly, the pieces of information such as a part number, a manufacturing date, and a manufacturing location of the heating-roller body 411 are able to be obtained by reading the identification information 70 provided on the heating-roller body 411 by using a reading device such as a QR code reader (including a smartphone).

When, for example, the service engineer or a developer who investigates the causes of failure of the fixing device 40 obtains pieces of information such as a part number, a manufacturing date, and a manufacturing location of the heating-roller body 411, the presence/absence of the same or similar problems in heating-roller bodies 411 of the same or similar part number or manufacturing date, countermeasures against the case where the same or similar problems occur, or the like are able to be searched in accordance with the identification information 70.

According to the present exemplary embodiment, as illustrated in FIG. 10, the identification information 70 of the heating-roller body 411 is provided at the position corresponding to the space 82 of the drive gear 412. During continuous use of the fixing device 40, due to, for example, a small gap between heating-roller body 411 and the drive gear 412 in the circumferential direction, the inner circumferential surface of the cylinder portion 412a of the drive gear 412 may slide against the outer circumferential surface of the heating-roller body 411 when the fixing device 40 is started or stopped, or the speed of the fixing device 40 is varied. Even in this case, the identification information 70 of the heating-roller body 411, which is provided at the position corresponding to the space 82 of the drive gear 412, does not necessarily slide against the inner circumferential surface of the cylinder portion 412a of the drive gear 412. Accordingly, with the heating roller 41 according to the present exemplary embodiment, the identification information 70 of the heating-roller body 411 may be clearly read even when the fixing device 40 is used over time.

In contrast, in the case where the spaces 82 are not provided in the inner circumferential surface of the heating-roller body 411 and the inner circumferential surface of the drive gear 412 slides against the identification information 70 provided on the outer circumferential surface of the heating-roller body 411, the identification information 70 of the heating-roller body 411 may be worn, and accordingly, it may be difficult to read the identification information 70 when the fixing device 40 is used over time.

Second Exemplary Embodiment

Figure 11:
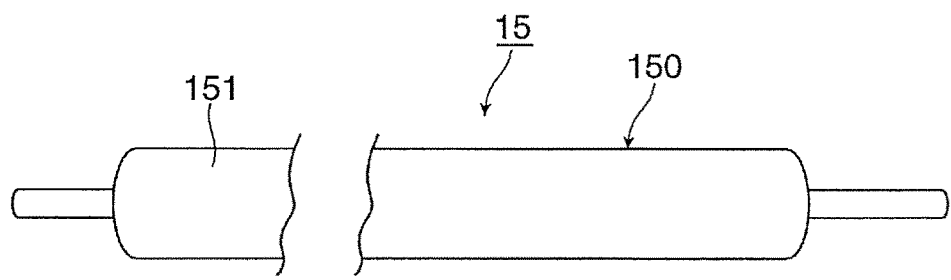
FIG. 11 is a structural view of a sheet transport device for which a rotating member according to a second exemplary embodiment of the present invention is used.

FIG. 11 illustrates a sheet transport device for which a rotating member according to a second exemplary embodiment is used. The sheet transport device is used for the transfer device 15 as illustrated in FIG. 1 that transfers the toner image formed on the photosensitive drum 11 onto the recording sheet 5 and transports the recording sheet 5.

As illustrated in FIG. 11, the transfer device 15 includes a transfer roller 150 serving as an example of a columnar rotating member. The transfer roller 150 includes a transfer-roller body 151 and a drive gear 152. The drive gear 152 is provided at one end portion of the transfer-roller body 151 in the axial direction. The transfer-roller body 151 includes a columnar member 153 and a conductive layer 154. The columnar member 153 is formed of metal such as stainless steel and has a columnar shape. The conductive layer 154 is coated over the surface of the columnar member 153 to a comparatively large thickness, so that the specific resistance of the conductive layer 154 is adjusted. As the transfer voltage, a direct-current voltage the polarity of which is opposite to the polarity to which the toner is charged is applied from a power unit (not illustrated) to the transfer-roller body 151.

Figure 12:
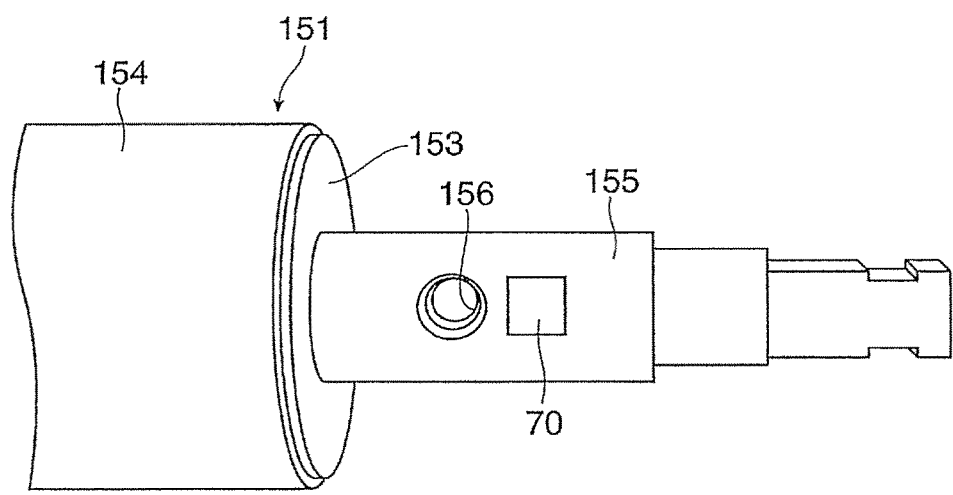
FIG. 12 is a structural perspective view of part of a transfer roller.
Figure 13:
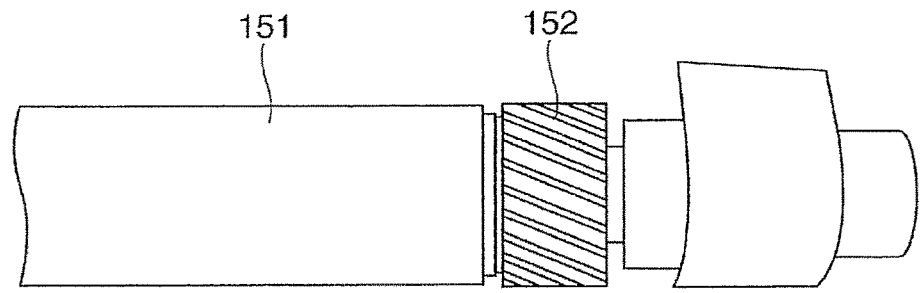
FIG. 13 is a perspective structural view of part of the transfer roller.
Figure 14:
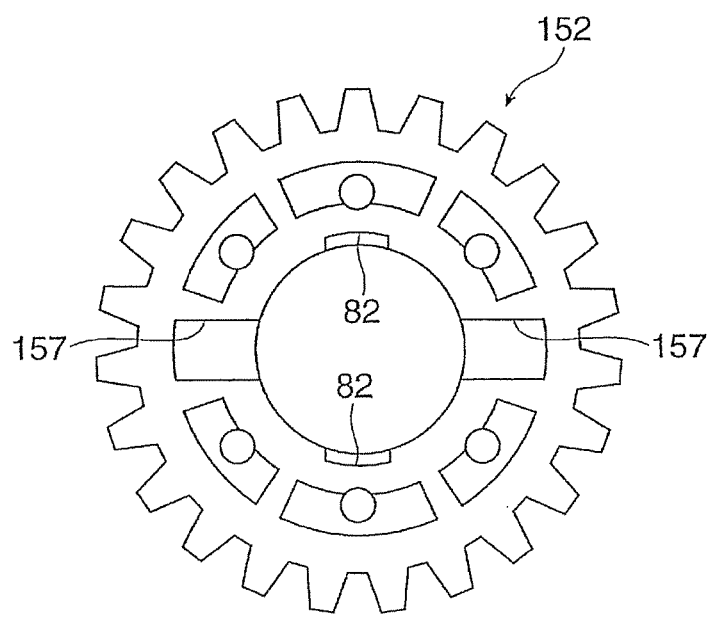
FIG. 14 is a structural side view of a drive gear.

As illustrated in FIG. 12, an insertion hole 156 for attachment of the drive gear 152 is formed in a holding portion 155 which is the one end portion of the transfer-roller body 151 and to which the drive gear 152 is attached. Referring to FIG. 14, the drive gear 152 is attached by inserting the drive gear 152 onto the holding portion 155 of the transfer-roller body 151 and, in this state, by inserting a securing pin into a recess 157 formed on one side surface of the drive gear 152 through the insertion hole 156. Furthermore, the identification information 70 is provided at positions adjacent to the insertion hole 156 near the end portion in the axial direction in the holding portion 155 which is the one end portion of the transfer-roller body 151 and to which the drive gear 152 is attached. Examples of pieces of the identification information 70 include, for example, a part number, a manufacturing date, and a manufacturing location of the transfer-roller body 151 and a lot number of the conductive layer 154 of the transfer-roller body 151.

Furthermore, as illustrated in FIG. 14, the drive gear 152 has the spaces 82 at positions corresponding to the positions of the identification information 70 of the transfer-roller body 151, so that an inner circumferential surface of the drive gear 152 is not in direct contact with the identification information 70.

Third Exemplary Embodiment

FIGS. 15A and 15B illustrate a sheet transport device for which rotating members according to a third exemplary embodiment are used. The sheet transport device is used for the sheet transport roller pairs 60 and 61 disposed in the duplex transport path 59 as illustrated in FIG. 1.

As illustrated in FIGS. 15A and 15B, the sheet transport roller pair 60 and 61 include drive rollers 601 and 611. Each of the drive rollers 601 and 611 serves as an example of a columnar rotating member. The drive rollers 601 and 611 include respective drive-roller bodies 602 and 612 and respective drive gears 603 and 613. Each of the drive gears 603 and 613 is provided at one end portion of a corresponding one of the drive-roller bodies 602 and 612 in the axial direction. The drive-roller bodies 602 and 612 include columnar members 604 and 614, plural transport portions 605 and plural transport portions 615. The columnar members 604 and 614 are formed of, for example, synthetic resin so as to have a columnar shape. The transport portions 605 and 615 having large diameters are provided at intermediate positions of the columnar members 604 and 614 in the axial direction.

The drive-roller bodies 602 and 612 include respective holding portions 606 and 616. Each of the holding portions 606 and 616 is one end portion of a corresponding one of the drive-roller bodies 602 and 612. Each of the drive gears 603 and 613 is attached to a corresponding one of the holding portions 606 and 616. As illustrated in FIG. 15B, the identification information 70 is provided near an end portion in the axial direction in each of the holding portions 606 and 616. Examples of pieces of the identification information 70 include, for example, a part number, a manufacturing date, and a manufacturing location of the drive-roller bodies 602 and 612.

Figure 16:
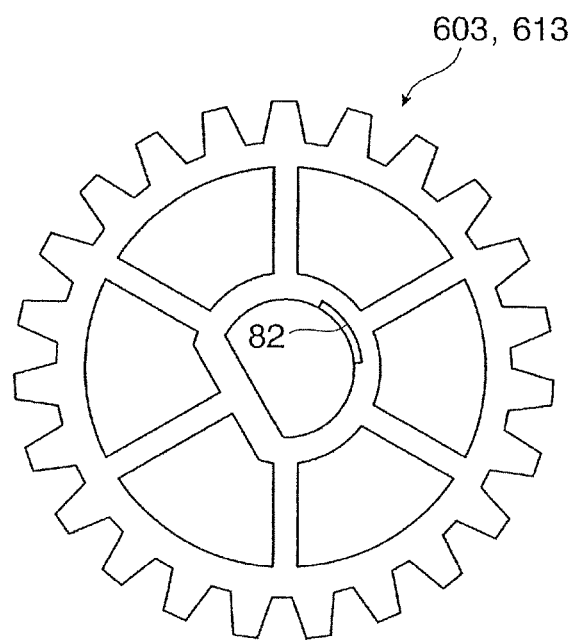
FIG. 16 is a structural side view of a drive gear.

Furthermore, as illustrated in FIG. 16, each of the drive gears 603 and 613 has the space 82 at a position corresponding to the position of the identification information 70 of a corresponding one of the drive-roller bodies 602 and 612, so that neither an inner circumferential surface of the drive gear 603 nor an inner circumferential surface of the drive gear 613 is in direct contact with the identification information 70.

Fourth Exemplary Embodiment

Figure 17:
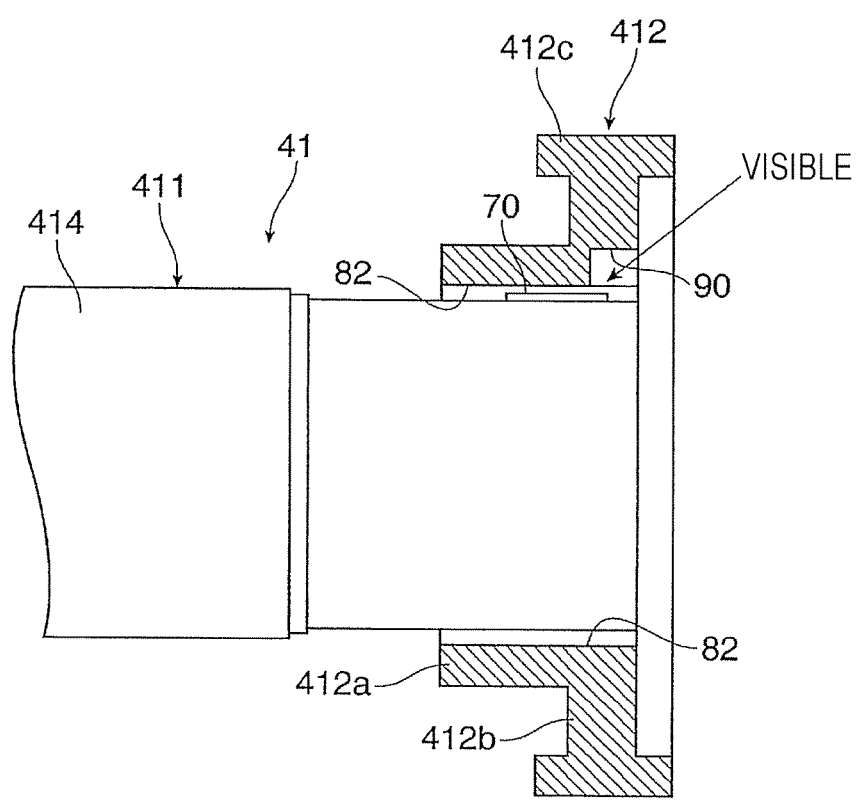
FIG. 17 is a structural sectional view of part of the fixing device for which a rotating member according to a fourth exemplary embodiment of the present invention is used.

FIG. 17 illustrates a fixing device for which a rotating member according to a fourth exemplary embodiment is used.

According to the above-described exemplary embodiments, the spaces are provided in the inner circumferential surface of the holding member. According to the fourth exemplary embodiment, the drive gear 412 has a cut 90 provided at one end portion thereof so that at least part of the identification information is visible from the outside. Alternatively, instead of the cut 90, the one end portion of the drive gear 412 may be formed of transparent resin so as to provide a transparent portion. Thus, at least part of the identification information is visible from the outside through this transparent portion.

Although the image forming apparatus is of a monochrome type according to the above-described exemplary embodiments, of course, the techniques herein are able to be similarly used for a full-color image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rotating member comprising:
   a cylindrical or columnar rotating-member body that has one end portion and an outer circumferential surface and that is to be rotated;
   identification information provided at the one end portion on the outer circumferential surface of the rotating-member body; and
   a holding member that is provided at the one end portion of the rotating-member body, that holds the rotating-member body, and that has an inner circumferential surface in part of which a space not to be in contact with the outer circumferential surface of the rotating-member body is provided,
   wherein the identification information is disposed in the space of the holding member.

2. The rotating member according to claim 1,
   wherein the holding member includes at least one first projection that is disposed on the inner circumferential surface of the holding member and that is to be in contact with the outer circumferential surface of the rotating-member body.

3. The rotating member according to claim 2,
   wherein the at least one first projection includes a plurality of first projections arranged in a circumferential direction of the holding member.

4. The rotating member according to claim 2,
   wherein the holding member includes a second projection on the inner circumferential surface thereof,
   wherein the rotating-member body has a first cut at the one end portion thereof, and
   wherein, when the holding member is attached, the second projection is inserted into the first cut.

5. The rotating member according to claim 3,
   wherein the holding member includes a second projection on the inner circumferential surface thereof,
   wherein the rotating-member body has a first cut at the one end portion thereof, and
   wherein, when the holding member is attached, the second projection is inserted into the first cut.

6. The rotating member according to claim 4,
   wherein an amount of projection of the second projection is larger than an amount of projection of the at least one first projection.

7. The rotating member according to claim 5,
   wherein an amount of projection of the second projection is larger than an amount of projection of each of the plurality of first projections.

8. The rotating member according to claim 4,
   wherein the second projection extends in an axial direction of the rotating-member body.

9. The rotating member according to claim 5,
wherein the second projection extends in an axial direction of the rotating-member body.

10. The rotating member according to claim 6,
wherein the second projection extends in an axial direction of the rotating-member body.

11. The rotating member according to claim 7,
wherein the second projection extends in an axial direction of the rotating-member body.

12. The rotating member according to claim 1,
wherein the holding member has one end portion that has a second cut or a transparent portion through which at least part of the identification information is visible from an outside.

13. A sheet transport device comprising:
the rotating member according to claim 1.

14. A fixing device comprising:
the rotating member according to claim 1.

15. An image forming apparatus comprising:
the sheet transport device according to claim 13.

16. An image forming apparatus comprising:
the fixing device according to claim 14.

\* \* \* \* \*